United States Patent [19]
Campanella et al.

[11] 3,789,165
[45] Jan. 29, 1974

[54] ECHO CANCELLER WITH VARIABLE THRESHOLD

[75] Inventors: Samuel Joseph Campanella, Gaithersburg; Henri George Suyderhoud, Potomac; Michael Onufry, Jr., Gaithersburg, all of Md.

[73] Assignee: Communications Satellite Corporation (Comsat), Washington, D.C.

[22] Filed: Apr. 24, 1972

[21] Appl. No.: 246,785

[52] U.S. Cl. .............................................. 179/170.2
[51] Int. Cl. .............................................. H04b 3/22
[58] Field of Search .................................. 179/170.2

[56] References Cited

UNITED STATES PATENTS

| | | | |
|---|---|---|---|
| 3,632,905 | 1/1972 | Thomas | 179/170.2 |
| 3,499,999 | 3/1970 | Sondhl | 179/170.2 |

*Primary Examiner*—Kathleen H. Claffy
*Assistant Examiner*—Alan Faber
*Attorney, Agent, or Firm*—Sughrue, Rothwell, Mion, Zinn & Macpeack

[57] ABSTRACT

An echo canceller having a digital transversal filter with adjustable gain coefficients and an adaptive control loop for achieving minimum echo and similar speed of convergence for loud and soft talkers. Minimum echo is attained by subtracting a synthesized echo from the real echo, the synthesized echo being formed in a digital transversal filter by multiplying a stored replica of the impulse response times the incoming signal. The stored replica is updated using the steepest descent technique by adjusting each of the stages of the replica memory a given amount. Adjustment is made when the echo error and the sampled incoming signal are above respective threshold levels. The threshold level for the sampled signal is made dependent upon the average of the samples over a period of time to provide substantially the same speed of convergence for loud and soft talkers.

4 Claims, 2 Drawing Figures

PATENTED JAN 29 1974 3,789,165

ECHO CANCELLER WITH VARIABLE THRESHOLD

BACKGROUND OF THE INVENTION

The invention is in the field of echo cancellers and in particular is an improved echo canceller.

It is well known that hybrid circuits connecting two wire to four wire circuits do not provide echo free coupling between the receive and send lines of the four wire circuit. A portion of the signal, typically voice signals, on the receive line will pass to the send line and appear as an echo signal. When the four wire system is used for long distance communications, such as via a submarine cable or a communications satellite, the echo signal can be particularly disturbing.

Echo suppressors are commonly used for removing the echo caused by imperfection in the hybrid or other echo path by attenuating the send line signal. One class of such suppressors operates to interrupt the send line whenever a voice level signal is detected on the receive line. This will eliminate echo but will also eliminate voice signals emanating from the local two-wire circuit and therefore clip the outgoing conversation. A double talk detector is conventionally used to reduce interruption of the send line, normally caused by voice signals on the receive line, when voice signals are simultaneously emanating from the two wire circuits, i.e., speakers at both ends are talking simultaneously. However, if the speaker at the local two wire circuit is speaking softly relative to the speaker at the far end, the larger voice signal on the receive line may prevent operation of the double talk detector and thus the send line will be interrupted thereby clipping the speech on the send line. When the double talk detector does operate correctly, the echo will not be prevented during double talk, but is transmitted along with the near talker speech.

A newer class of devices for handling the echo problem is known as echo cancellers. An echo canceller does not interrupt the send line but generates an approximation, $\hat{y}(t)$, of the echo $y(t)$, and subtracts the former from the signal appearing on the send line. The remaining signal on the send line during double talk is $S(t)+e(t)$, where $S(t)$ is the local voice signal and $e(t)$ is the residual error caused by $\hat{y}(t)$ not being exactly equal to $y(t)$.

The basis of operation of echo cancellers is that the echo path may be regarded as a filter and satisfies the relation:

$$y(t)=\int_0^{\infty} f(t-\tau)k(\tau)d\tau,$$

where $f(t)$ is the signal applied to the echo path, $k(\tau)$ is the impulse response of the echo path, and $y(t)$ is the echo.

In one particular implementation of the above equation, digital circuits are used. An X memory stores digitized samples of the incoming signal $X(t)$ over a period T, and an H register stores a digital representation of the impulse response of the echo path. Both memories recirculate, but the oldest sample in the X memory is replaced each sample period by a new sample of the signal $X(t)$. Digital convolution is performed on the contents of the two memories, the contents are multiplied, sample by sample, and the products are summed resulting in an approximation, $\hat{y}(t)$, of the echo. In one case, the impulse response of the echo path is stored in the H memory by using the search or interrogating pulse technique. That is, after the circuit is set up between caller and called stations, but before conversation begins, an artificial search or interrogating pulse is applied to the receiving line. The pulse passes through the echo path, and the resultant signal on the send line is the impulse response of the echo path. The impulse response is sampled over the period T, digitized and stored in the H register.

For a number of reasons, including the fact that the impulse response of the echo path will not be constant, the search pulse technique is not satisfactory. More recent cancellers continuously compute an impulse response that minimizes the mean squared error between $y(t)$ and $\hat{y}(t)$. The computation circuitry includes an adaptive control loop, respnsive to the residual error, $e(t)$, and the receive side signal $x(t)$, for implementing the steepest-descent technique by adjusting the N samples of the H memory through incrementing or decrementing each sample by a given amount. After convergence, i.e., attainment of minimum error or echo, the contents of the H memory represent, in digital form, the impulse response of the echo path. The time of convergence and amplitude of residual echo, $e(t)$, are important characteristics in any canceller.

The adaptive control loop consists of a cross correlator and a corrector circuit. The cross correlator consists of two threshold detectors and a sign product generator. One threshold detector, with threshold Δ1, determines if each of the samples of the receive side signal, $x_i$, which are stored in an X memory, exceeds Δ1, and if so, determines its sign. The second threshold detector, with threshold Δ2, determines if the residual echo, $e(t)$, exceeds Δ2, and subsequently determines its sign. The sign product of $e(t)$ and $x_i$ is then used to direct an adder of the corrector circuit to add or subtract a single bit, $h$, from each of the corresponding H word contents of the memory.

A disadvantage occurs in the above-described prior art when operating on telephone speech which varies widely in loudness. For example, if the value of Δ1 is adjusted to operate optimally for loud speech, then soft speech suffers a disadvantage because of the number of times that soft speech samples exceed Δ1 and hence the number of H-memory corrections is greatly reduced. Thus, convergence will be slower for soft speech than for loud speech. A smaller value of Δ1 will accommodate soft speech but will cause loop instability for loud speech.

SUMMARY OF THE INVENTION

The invention is an echo canceller of the above-described type in which an improvement is added to obtain equal canceller performance, in terms of convergence speed and ultimate echo level, for talkers with levels ranging from soft to loud. The improvement is realized by adjusting the Δ1 threshold in proportion to a measure of the level of the received speech signal. The net effect is that, on the average, the number of corrections during each cycle of self-adaptation stays constant. Since the speed of convergence id proportional to the average number of corrections per cycle, the speed of convergence is constant for talkers ranging from soft to loud.

DETAILED DESCRIPTION OF THE DRAWINGS

Figures 1, 2:
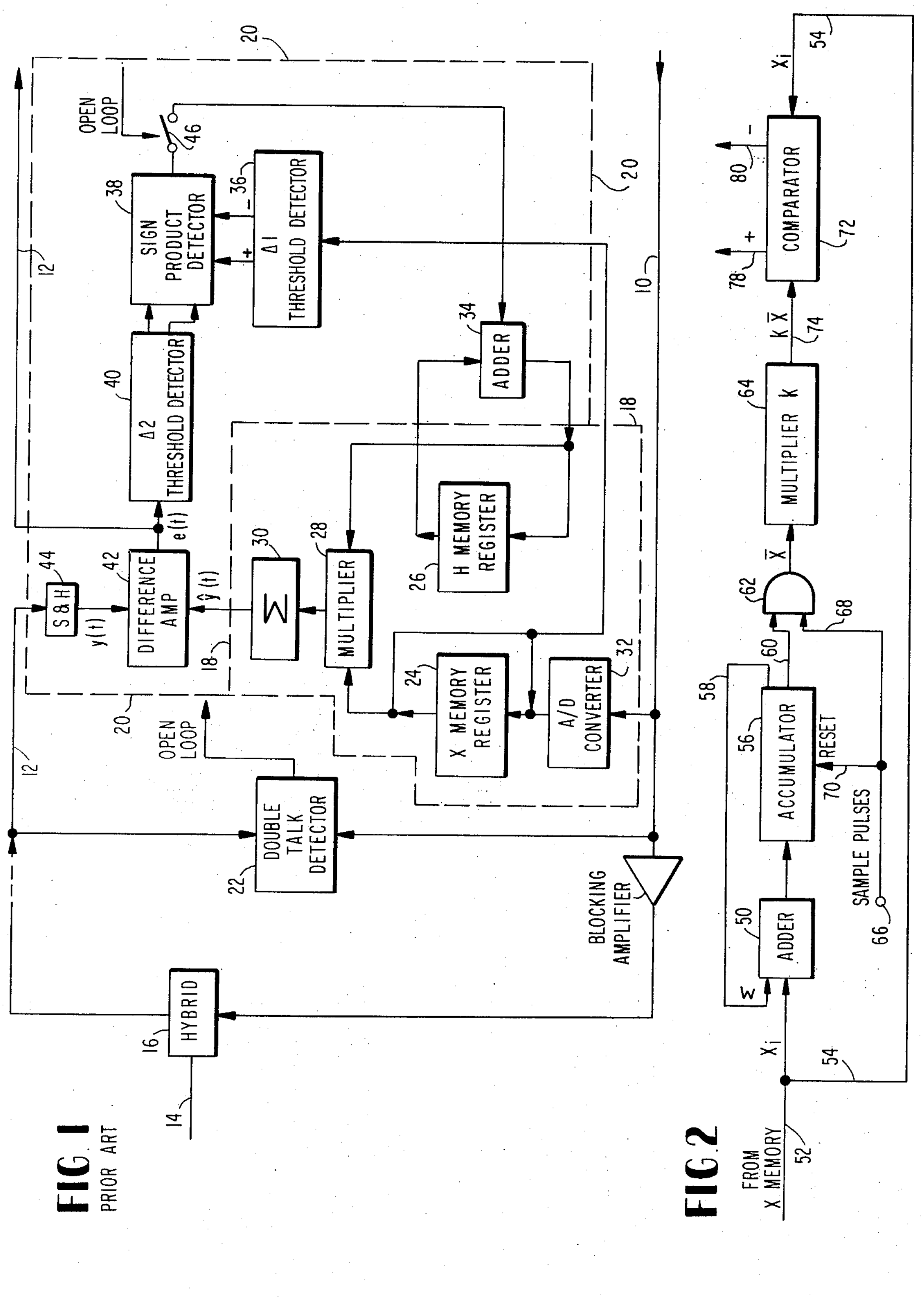
FIG. 1 PRIOR ART, FIG. 2
FIG. 1 is a block diagram of a prior art echo canceller.
FIG. 2 is a block diagram of a preferred embodiment of the improvement described herein. The logic illustrated provides a variable threshold for the sampler in the adaptive control loop.

The block diagram shown in FIG. 1 represents an echo canceller of the prior art type. The four wire circuit comprising receive line 10 and send line 12 is connected to the two wire circuit 14 by a hybrid circuit 16. The echo path is defined as that path from the receive-out side via hybrid 16 to the send-in side of the echo canceller. The two major components of the canceller are a digital transversal filter 18 and an adaptive control loop 20.

The digital transversal filter, 18, comprises an analog to digital converter 32 which samples the incoming signal $X(t)$ at the Nyquist rate and converts each sample into an $n$-bit digital word, an X memory register which stores N samples of $X(t)$, $x_1$ through $x_N$, and recirculates once each sample period, an H memory register which stores N digital words, $h_1$ through $h_N$, a multiplier circuit which multiplies $x_i$ by $h_i$, and a summation circuit, 30, for summing the multiplier output over the sample period. The output of the summation circuit, 30, is an approximation $\hat{y}(t)$ of the echo $y(t)$.

The H memory 26 is initially $h_i=0$ for $i=1,2,3, \ldots$ N. Digital convergence is provided by the adaptive control loop, 20,which comprises: a sample and hold circuit 44, for sampling the echo $y(t)$, appearing on the send line 12; a difference amplifier 42 for receiving $y(t)$ and $\hat{y}(t)$ and deriving the residual echo, $e(t)$; a Δ2 threshold circuit, 40, for determining if $|e(t)|$ is above a minimum amplitude Δ2 and for providing an output indicating the sign of e(t) when $|e(t)|$ exceeds the threshold; a Δ1 threshold circuit 36 for detecting if $|x_i|$ exceeds the threshold Δ1 and for providing an indication of the sign of $x_i$ when the threhold is exceeded; a sign product detector, 38 for providing an output indicative of the sign product of $x_i$ and $e(t)$; an adder, 34, for adding or subtracting an incremental amount, $\Delta h_i$, to the sample $h_i$ to form the new sample $h_i^*=h_i \pm \Delta h_i$.

In order to prevent the adaptive control loop from responding to $S(t) + e(t)$, which will occur when $S(t)$ and $X(t)$ occur simultaneously, a conventional double talk detector 22 may be used. The detector 22 is not used in the conventional manner to interrupt the send line, but is used to open the adaptive control loop as indicated generally at 46. It will be noted that when the adaptive control loop 20 is opened, the signal $\hat{y}(t)$ continues to be subtracted from $S(t) + y(t)$, however, the H memory is not updated.

In the cancellers described above, the values of Δ1 and Δ2 have practical lower bounds because of their relationship to both the speed of converging to minimum echo and the stability of the convergence algorithm which utilizes the steepest-descent method. Small values for Δ1 and Δ2 are theoretically desirable. A small value for Δ1 increases the speed of convergence, and a small value of Δ2 reduces the residual echo level in additon to increasing the speed. However, practical limits are imposed by the fact that false corrections may take place in the updating circuit and jeopardize the stability when low signal levels, relative to noise, are present.

Mathematically, it can be shown that for a given error, $e$, the change needed in each $h_i$ to converge to zero error is given by, $$\Delta h_i = \frac{e \cdot x_i}{\Sigma x_i^2}$$

In practice the contents of the H memory are not changed immediately in accordance with the above formula. Instead, the $h_i$ elements are altered an incremental amount $\pm C$, in the right direction to achieve minimum echo. The high speed of digital techniques allows good convergence speed. The sign of the correction increment C for any $h_i$ is determined by the sign product, (sign $e$) · (sign $x_i$) = (sign $C$).

Correction of any $h_i$ will only occur when both $|e|$ and $|x_i|$ are above their respective threshold levels, Δ2 and Δ1 respectively. An improvement in the speed of convergence is attained by using several values of $C$, selecting larger ones when $e(t)$ is relatively larger and selecting smaller ones when $e(t)$ is relatively small. That improvement is described in copending U.S. Pat. application Ser. No. 204,507, filed Dec. 3, 1971, by the same inventors herein and titled, "Adaptive Echo Canceller With Multi-Increment Gain Coefficient Corrections." The improvement of the present invention involves setting the threshold Δ1 proportional to $\bar{X}$, the average value of all $x_i$ in the $X$ register. The value Δ1 is made equal to $K\bar{X}$ where $K$ is a constant. The value of $K$ is not critical and may be experimentally selected to achieve good convergence speed without instability. One suggested value for $K$ is ½. It should be noted that the improvement of this invention and the one described in the above-mentioned application are preferably used together in an echo canceller, but each may be used separately.

The improvement of the subject invention is realized by substituting the combination of logic shown in FIG. 2 for the Δ1 threshold detector 36 shown in FIG. 1. The logic operates to compute the average $$|\bar{X}| = \sum_{i=1}^{N} |x_i|$$

during each sample period, multiply $|\bar{X}|$ by a constant $K$, and comparing threshold value $|K\bar{X}|$ with each $|x_i|$. If $|x_i| > |K\bar{X}|$, an output will appear at either the (+) or (−) terminals of a comparator indicating respectively the sign of $x_i$.

For purpose of setting forth an example, it is assumed that each $x_i$ is a nine bit vector. The $x_i$ vectors from the X memory register 24 are applied to an adder 50 via input line 52. The output from adder 50 is accumulated in an accumulator 56, whose output, in turn, is applied to the second input of adder 50 via lead line 58. A general statement of the adder function is, $$|x_i| + \sum_{m=1}^{i-1} |x_m| = \sum_{m=1}^{i} |x_m|$$

As stated previously the X memory register 24 recirculates every sample period. Thus, during each sample interval the adder/accumulator combination computes the sum $$\sum_{i=1}^{N} |x_i|,$$

, where $N$ is the number of $x$ samples in the X memory register. Averaging is accomplished simply by gating out on line 60 and gate 62 the nine most significant bits of the sum accumulated in the accumulator 56. Gating takes place in response to sample pulses appearing at terminal 66 and applied to gate 62 via lead line 68. The sample pulses are preferably the same sample pulses (not shown) which initiate sampling of the receive side signal $x(t)$ at the input to the A/D converter 32. The sample pulses are also applied via lead line 70 to clear or reset accumulator 56.

The output from gate 62, representing the average value $|\bar{X}|$ is multipled by constant K in multiplier 64 to obtain the Δ1 threshold value $|K\bar{X}|$. As will be apparent, the Δ1 threshold value is recomputed each sample interval. The multiplication may be performed, as an example, by shifting the bits of $|\bar{X}|$. If $K=½$, outputs from accumulator 62 may be selected and gated to shift the nine bit vector one bit position.

The value $|K\bar{X}|$ is provided via lead line 74 as one input to comparator 72. The other input to comparator 72 receives the $x_i$ vectors via lead line 52 and lead line 54. The comparator operates simply to compare $|x_i|$ and $|K\bar{X}|$, and, if $|x_i|>|K\bar{X}|$,
to provide a logic "1" output on lead lines 78 and 80 depending upon whether $x_i$ is positive or negative respectively.

If the sample values are stored as absolute values plus sign, the absolute values could be accumulated simply by ignoring the signs in the adder/accumulator combination. Otherwie, additional, but conventional, logic will be necessry to convert the negative values to equal amplitude positive values, before adding the values in adder 50.

What is claimed is:

1. In an echo canceller of the type having a transversal filter means for performing convolution of an input signal on a receive line and a replica of the impulse response of an echo path to generate an approximation of an echo signal for subtraction from a real echo signal on a send line, and an adaptive control loop responsive to the residual echo resulting from said substraction and to stored samples of said input signal for incrementally varying said replica to reduce said residual echo, said transversal filter comprising means to store a plurality of samples of said input signal and for replacing the oldest sample with each new sample, said adaptive control loop comprising means for varying elements of said replica only in response to said residual echo and said individual stored samples being greater than threshold levels, the improvement comprising, variable threshold means in said adaptive control loop responsive to said stored samples for comparing each stored sample to a threshold level proportional to the average value of the amplitudes of said stored samples.

2. An echo canceller as claimed in claim 1 wherein said variable threshold means comprises, arithmetic means responsive to the amplitude of said stored samples for generating a value proportional to the average of the amplitude of said stored samples during each sample interval, and comparison means for comparing each said sample to said generated value during each sample period and for providing an output indicative of the sign of each said sample which exceeds said generated value.

3. An echo canceller for reducing echoes on the send side of a four wire system caused by signals received on the receive side of said four wire system, said echo canceller comprising, a. means for periodically sampling the signals on said receive side, b. sample storage means for storing the latest N of said samples, c. replica storage means adapted to store a replica of the impulse response of an echo path, d. means for multiplying and summing, during each sample period, the contents of said sample storage means and said replica storage means to compute a replica of an echo, e. subtraction means for subtracting said echo replica from an echo on said send line to form a residual echo, f. first threshold means responsive to said residual echo for providing an indication of the sign of said residual echo if said residual echo exceeds a first threshold level, g. second threshold means responsive to the samples in said sample storage means for providing an indication of the sign of each of said samples which exceeds a value proportional to the average amplitude of said stored samples, and h. replica storage correction means responsive to said first and second threshold means for altering said stored replica.

4. An echo canceller as claimed in claim 3, wherein said second threshold means comprises arithmetic means responsive to the amplitude of said stored samples for generating a value proportional to the average of the amplitudes of said stored samples during each sample interval, and comparison means for comparing each said sample to said generated value during each sample period and for providing an output indicative of the sign of each said sample which exceeds said generated value.

* * * * *

UNITED STATES PATENT OFFICE
CERTIFICATE OF CORRECTION

Patent No. 3,789,165 Dated January 29, 1974

Inventor(s) Samuel Joseph CAMPANELLA et al

It is certified that error appears in the above-identified patent and that said Letters Patent are hereby corrected as shown below:

Column 2, line 18 - delete "respnsive" and insert -- responsive -- line 33 - delete "$\Delta$ 1" and insert -- $\Delta$ 1 -- (numeral 1)

line 64 - after "convergence" delete "id" and insert -- is --

Column 5, line 9 - delete "," before "where"

Signed and sealed this 11th day of June 1974.

(SEAL)
Attest:

EDWARD M.FLETCHER,JR.
Attesting Officer

C. MARSHALL DANN
Commissioner of Patents